United States Patent [19]

Cavicchioli

[11] Patent Number: 4,552,713
[45] Date of Patent: Nov. 12, 1985

[54] METHOD OF FORMING AN IMPROVED HANDGRIP HAVING NON-SLIP FEATURES

[75] Inventor: A. G. Cavicchioli, Fort Worth, Tex.

[73] Assignee: Jamak, Inc., Weatherford, Tex.

[21] Appl. No.: 582,054

[22] Filed: Feb. 21, 1984

Related U.S. Application Data

[63] Continuation-in-part of Ser. No. 463,904, Feb. 4, 1983, abandoned.

[51] Int. Cl.$^4$ .............................................. B29C 59/02
[52] U.S. Cl. ..................................... 264/162; 264/139; 264/236; 264/347; 264/DIG. 6; 524/270
[58] Field of Search ............... 264/162, 131, 236, 347, 264/331.11, 150, DIG. 6, 139; 524/270

[56] References Cited

U.S. PATENT DOCUMENTS

| | | | |
|---|---|---|---|
| 1,768,933 | 7/1930 | Riley | 264/131 |
| 2,297,204 | 9/1942 | Deissner | 264/162 |
| 2,342,556 | 2/1944 | Rockoff | 264/162 |
| 3,281,515 | 10/1966 | Schmitz | 264/236 |
| 3,353,981 | 11/1967 | Jacob | 264/DIG. 6 |
| 3,539,671 | 11/1970 | Nauta | 264/162 |
| 3,864,443 | 2/1975 | Hopkins | 264/150 |
| 3,984,509 | 10/1976 | Hall et al. | 264/171 |
| 4,143,109 | 3/1979 | Stockum | 264/131 |
| 4,268,574 | 5/1981 | Peccenini et al. | 264/DIG. 6 |

Primary Examiner—Jeffery Thurlow
Attorney, Agent, or Firm—James E. Bradley; Charles D. Gunter, Jr.

[57] ABSTRACT

A handgrip, such as a golf club grip, having improved non-slip features is shown which is formed from a silicone rubber composition. The silicone rubber composition comprises an organopolysiloxane gum, a silica filler material, as organosilicone processing aid, a texturizing material, and a quantity of hollow spheres. The texturizing material and spheres are first blended into the composition while heating the composition. The rubber composition is then placed in a suitable mold and cured with a peroxide catalyst to form the handgrip. The external surface of the cured handgrip is buffed to fracture the hollow spheres nearest the surface and improve the non-slip character of the handgrip.

3 Claims, 4 Drawing Figures

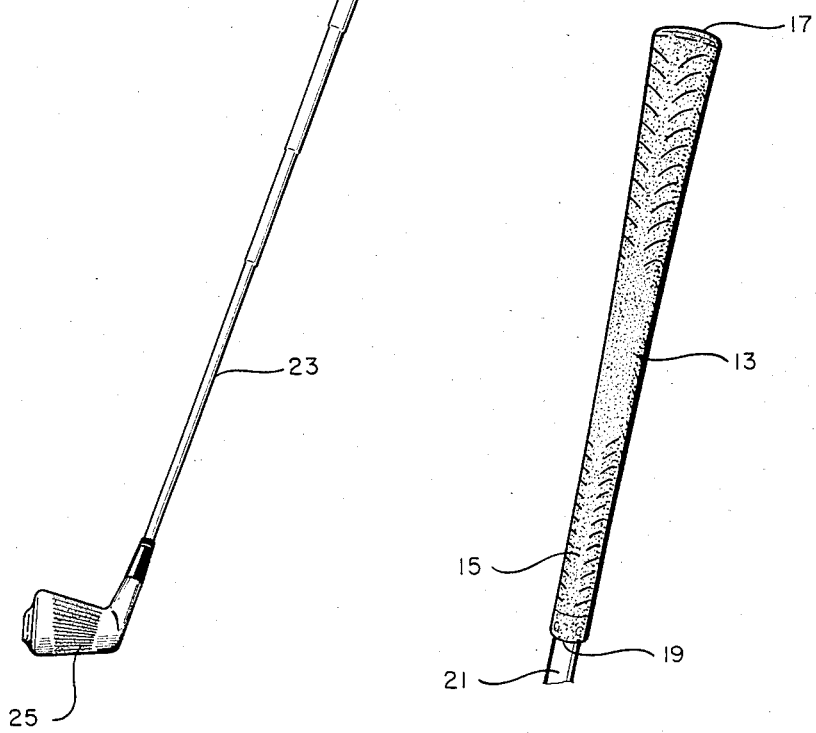

4,552,713

METHOD OF FORMING AN IMPROVED HANDGRIP HAVING NON-SLIP FEATURES

BACKGROUND OF THE INVENTION

This application is a continuation-in-part of my earlier filed, co-pending application, Ser. No. 463,904, filed Feb. 4, 1983, now abandoned.

FIELD OF THE INVENTION

The present invention relates to elastomeric handgrips and, specifically, to silicone rubber handgrips having improved non-slip characteristics.

DESCRIPTION OF THE PRIOR ART

Silicone compositions were produced commercially as early as the late 1930's and early 1940's. The unique physical properties of silicone, such as its thermal resistance and dielectric properties, made silicone compositions well suited for numerous applications. Early uses for silicone compositions included electrical insulating applications and greases for military use. One class of silicone compositions, silicone elastomers or rubbers, are recognized for their outstanding ability to resist change at elevated temperature and exposure to adverse weather conditions over extended periods of time. Silicone rubbers have today evolved to become very versatile elastomers with the estimated annual silicone usage in the United States having grown to over 50 million pounds.

Silicone rubbers have mainly been used, in the past, in applications at extremely high or low temperatures. Typical uses are wire and cable insulation, gaskets, seals and O-rings for aircraft, and seals for electric and electronic equipment. They are effective in an approximate range of $-50°$ F. to $450°-500°$ F.

Because of their special characteristics, silicone rubbers have not, in general, been widely used to form handgrips for hand tools such as hammers, sporting equipment such as golf clubs, machinery such as lawn mowers, and the like. A handgrip made from a silicone rubber has many advantages since the silicone rubber provides a longer lasting weatherable handgrip which is ozone resistant, which resists cracking or hardening with age and which maintains a consistent durometer, feel and flexibility.

In spite of the superior durability of handgrips formed from silicone rubbers, such grips have suffered from the characteristic of a slippery or slick finish due to the nature of the cured silicone elastomer. In the case of a silicone gasket or seal, a slippery finish or texture may not be a disadvantage and may even prove to be advantageous. In the case of a handgrip, however, it may be advantageous to provide a tacky or non-slip character or texture to the finished article.

A need exists, therefore, for a handgrip with the desirable weathering and aging characteristics of silicone rubber which has improved non-slip features.

A need also exists for a method of producing such a handgrip which utilizes commercially available materials and which can be carried out economically with a minimum of extra manufacturing steps and without requiring highly controlled process conditions.

SUMMARY OF THE INVENTION

The handgrip of the present invention is made from a silicone rubber composition adapted to be cured in a mold or extruded and vulcanized in the form of a handgrip. Preferably, the silicone rubber composition comprises an organopolysiloxane elastomer, a silica filler material and an organosilicone processing aid. The rubber composition can be cured with a suitable catalyst to form a handgrip using a variety of methods known in the art. A plurality of hollow beads or spheres is dispersed within the silicone rubber composition prior to curing. By lightly buffing the exterior surface of the cured product, a non-slip character is imparted to the cured handgrip. A texturizing material can also be added to the silicone rubber composition prior to curing.

In the preferred method of forming the handgrip of the invention, a silicone rubber composition is blended from an organopolysiloxane elastomer, a filler material, an organosilicone processing aid, a texturizing material, and a quantity of hollow spheres. The texturizing material is selected from the group consisting of synthetic resins, rosins, and pitch. The rubber composition is heated during the blending operation to evenly disperse the texturizing material and hollow spheres within the elastomer without reacting the texturizing material with the elastomer. The composition is then cooled, added to a suitable mold, and cured to form a handgrip. Once the handgrip is cured, the exterior surface is lightly buffed to improve the gripping characteristics of the product.

Additional objects, features, and advantages will be apparent in the written description which follows.

BRIEF DESCRIPTION OF THE DRAWINGS

FIG. 1 is a perspective view of a golf club having a handgrip of the present invention.

FIG. 2 is a close-up, perspective view of the grip of FIG. 1 with the club shaft shown broken away.

DETAILED DESCRIPTION OF THE INVENTION

Figure 3:
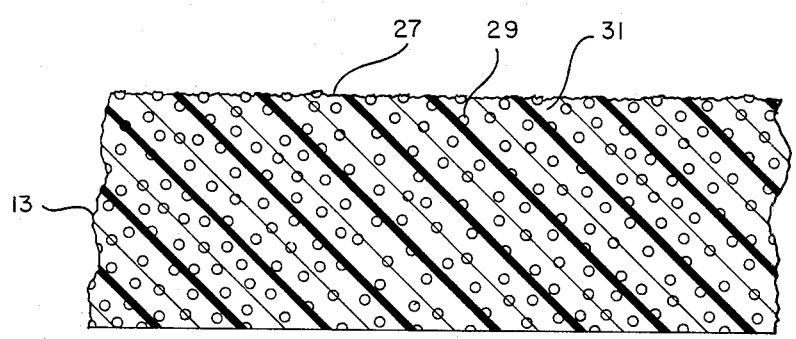
FIG. 3 is a simplified microscopic, cross-sectional view of the composition used in forming the handgrip of the invention, showing a quantity of hollow spheres dispersed within the composition.

Turning first to FIG. 1, there is shown a golf club, designated generally as 11, having a handgrip 13. Handgrip 13 is shown in greater detail in FIG. 2 and comprises a generally cylindrical body portion 15 having a closed end 17 and an open end 19. Open end 19, as shown in FIG. 2, is adapted to be slidingly received on the end 21 of the golf club shaft 23 which is opposite the club face 25.

The handgrip 13 is comprised of a silicone rubber composition which is adapted to be cured in a mold in the form of a handgrip in a variety of shapes or extruded and vulcanized, in the case of a straight grip. The silicone rubber composition is comprised of an organopolysiloxane elastomer, a filler material, and an organosilicon processing aid to which is added a quantity of hollow beads or spheres.

The rubber composition preferably includes 100 parts of an organopolysiloxane elastomer or gum. The organopolysiloxane elastomers employed in the practice of the present invention are well known materials and can be made by standard methods known in the art. The conventional silicone elastomer stock is based on organopolysiloxane gums which contain methyl, vinyl, phenyl and/or 3,3,3-trifluoropropyl radicals attached to the silicon atoms of the polymeric siloxane. Examples of organopolysiloxane gums are those polymers, copolymers and mixtures thereof wherein the siloxy units can be dimethylsiloxane, phenylmethylsiloxane, 3,3,3-trifluoropropylmethylsiloxane, diphenylsiloxane, methylvinylsiloxane and phenylvinylsiloxane.

Preferably, the organopolysiloxane gun is a polydimethylsiloxane having trimethylsiloxy chain stopping units consisting essentially of chemically combined dimethylsiloxy units. The preferred organopolysiloxane gum can also consist essentially of a mixture of dimethylsiloxy units and a minor amount of methylvinylsiloxy units, methylphenylsiloxy units, diphenylsiloxy units or dimethylphenylsiloxy units. These materials can contain minor amounts of methylsiloxy units, methylvinylsiloxy units or phenylsiloxy units, i.e., siloxy units having no more than one methyl or phenyl radical attached to silicone without adversely affecting the desirable properties of the gums.

The vinyl-containing and vinyl free organopolysiloxane gums of the present invention can be made by well known methods such as by the equilibration of methylcyclopolysiloxanes, mixtures of methylcyclopolysiloxanes and methylvinylcyclopolysiloxanes in combination with chain-stopping units such as those derived from hexamethyldisiloxane, 1,3-tetramethyldisiloxane, etc. Equilibration can be affected in the presence of standard equilibration catalysts such as potassium hydroxide, sodium hydroxide, phenylphosphoryl chloride, ferric chloride hexahydrate, etc. which is between about 25° C. to 160° C. for several hours or less. For example, a mixture of octamethylcyclotetrasiloxane-1,3,5,7-tetravinyl-1,3,5,7-tetramethylcylotetrasiloxane can be equilibrated with potassium hydroxide for about 4 hours at 160° C. to make the vinyl-containing organopolysiloxane gum.

The organopolysiloxane gums can also be made by known techniques involving the intercondensation of silanol-terminated polydiorganosiloxanes, such as polydimethylsiloxane, polydiphenylsiloxane and mixtures of polydimethylsiloxane with methylvinylsiloxy units utilizing a silylamine coupling agent such as a bis-(amino)-dimethylsilane, a bis-(amino)methylvinylsilane, etc.

The silicon elastomer stock utilized in the present invention can contain any of the conventional filler materials. These filler materials are well known in the art and are commercially available from a number of sources. The filler material is preferably a silica filler, sometimes referred to as reinforcing filler, or a mixture of silica filler and an extending filler. Examples of silica filler which can be utilized to reinforce the organopolysiloxane elastomer are fumed silica, precipitated silica, silica aerogel, etc. The filer material, including reinforcing and non-reinforcing fillers, is preferably used in the range of about 10–260 parts of filler per hundred parts of organopolysiloxane gum or elastomer, most preferably in the range of about 20 to 80 parts of filler.

The organosiloxane processing aids which can be utilized in the present invention are well known and include, for example, silanol-terminated polydiorganosiloxanes, such as taught by the Konkle et al. U.S. Pat. No. 2,890,188, alkoxy-teminated polydiorganosiloxanes, such as taught by Fekete U.S. Pat. No. 2,954,357, and silazane, silylamine, or other silicon-nitrogen materials taught by the Martellock U.S. Pat. No. 3,243,404. Some of the silanol-terminated polydiorganosiloxanes which can be employed are, for example, silanol-terminated polydimethylsiloxanes, and silanol-terminated polydiorganosiloxanes consisting essentially of chemically combined dimethylsiloxy units. In addition, the employment of such silanol-terminated polydiorganosiloxane, silanols such as diphenylsilanediol also can be employed. These silanol-terminated materials can be made by well known methods such as by hydrolyzing diorganodihalosilanes in the presence of acetone and an alklali bicarbonate such as shown by the Duane U.S. Pat. No. 2,744,923.

The alkoxy-terminated polydiorganosiloxanes which can be employed in the practice of the invention as process aids such as taught by the aforementioned Fekete patent are polysiloxanes having from about 4 to 35 chemically combined diorganosiloxy units terminated wih alkoxy radicals. For example, suitable materials are alkoxy-terminated, such as methoxy, ethoxy, hydroxy, propoxy and butoxy terminated polydimethylsiloxane, polysiloxane consisting essentially of chemically combined dimethylsiloxy units, diphenylsiloxy units, methylphenylsiloxy units, etc. In addition to the aforementioned silanol-terminated and alkoxy-terminated diorganosiloxanes, the process aids of the present invention also includes materials such as silylamines, silazanes, etc. Some of these silazanes which can be employed are, for example; cyclic silazanes, such as dimethylcyclotrisilazane, dimethylcyclotetrasilazane; linear silazane such as hexamethyldisilazane; 1,3-diphenyl-tetramethyldisilazane, etc.; silylamines such as bis-(amino)diphenylsilane, tris-amino-methylsilane, etc. Additional methods for making silazanes are shown by Sauer et al. JACS. vol. 68, 1946, pages 241–44, the Haber U.S. Pat. No. 2,462,635, the Cheronins Patents U.S. Pat. No. 2,579,416, 2,579,417, and 2,579,418, etc. Mixtures of the aforementioned process aids can also be utilized such as a mixture of any two of the aforementioned process aids or a mixture of the three process aids such as silanol-terminated polydimethyl-siloxane, methoxy-terminated methylphenylpolysiloxane and hexamethyldisilazane.

The processing aid is generally utilized in the range of about 1 to 20 parts processing aid per hundred parts organopolysiloxane gum, most preferably in the range of about 2 to 10 parts processing aid.

The rubber composition can also contain in texturizing material. The texturizing material of the invention can be any material selected from the group consisting of synthetic resins, rosins, and pitch which can be added to the rubber composition in an effective amount to provide a non-slip character to the finished handgrip. The texturizing material is dispersed within the elastomer during the blending operation, as will be described, and does not copolymerize or react with the elastomer. Preferably, the texturizing material is a synthetic resin. Suitable synthetic resins include ZONAREZ B-115, manufactured by Arizona Chemical Company of Fairlawn, N.J., and NEVTAC-100, manufactured by Neville Chemical Co. of Pittsburgh, Pa. These resins are both polyterpene resins which are commercially available. The ZONAREZ B-115 resin is preferred and has a softening point of 115° C. and specific gravity of 0.98 and is a solid at room temperature.

The texturizing material is preferably utilized in the range of about 10 to 200 parts per hundred parts of organopolysiloxane gum, most preferably in the range of about 20 to 40 parts texturizing material.

The silicone rubber compositions of the invention also have dispersed therein a quantity of hollow spheres or beads of the type referred to as "microspheres." Suitable materials include for instance, epoxy spheres, ceramic spheres, glass spheres, metal spheres and other materials which can be fractured by lightly sanding or buffing the exterior surface of the cured product.

The preferred spheres are commerically available from Zeeland Industries of St. Paul, Minn., as "ZEOSPHERES X-300" and a silica alumina ceramic spheres. Preferably, the spheres selected should have a maximum size of less then 300 microns, preferably below 50 microns. The preferred "ZEOSPHERES-X-300" have a maximum size of 5 microns.

The spheres must also be strong enough to withstand being blended into the silicone rubber composition and yet be capable of being fractured or broken by lightly sanding the exterior surface of the cured handgrip.

Hollow microspheres of the type under consideration can be loosely classified in terms of the wall thickness between the hollow center and the exterior surface of the sphere, using the density of the sphere as a guide to wall thickness. Thus a thin wall sphere would have a density on the order of 0.2, a medium wall sphere would have a density of 0.7, and a thick wall sphere would have a density of b 2.1. In order to have the required properties, the preferred spheres are those with a density in the range from about 0.5–0.9, with the most preferred spheres having a density of about 0.7.

The hollow, microspheres of the invention are preferably present in the silicon rubber composition in the range from about 5 to 20 percent by weight of composition, most preferably in the range of about 10 percent by weight. Using greater relative amounts of spheres tends to weaken the rubber composition, while using lower relative amounts reduces the improved grip characteristics of the product.

Figure 4:
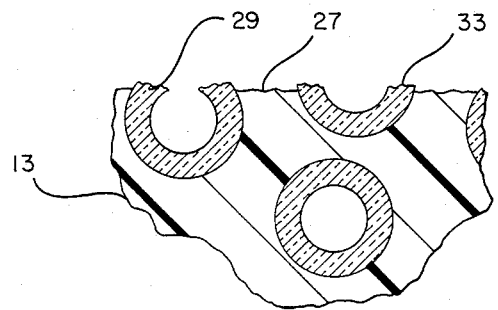
FIG. 4 is a cross-sectional view similar to FIG. 3 but of greater magnification, showing the fractured spheres at the surface of the handgrip.

FIG. 3 shows a simplified, cross-sectional view of the exterior surface 27 of a golf club grip 13 of the invention. The hollow spheres 29 are shown blended into and dispersed within the silicone rubber composition 31. FIG. 4 shows a view of greater magnification and illustrates the broken edges 33 of the sanded spheres which impart the improved non-slip character to the surface of the hand grips of the invention.

Various curing agents that can be employed to effect the more rapid conversion of the organopolysiloxane compositions to the cured solid elastic state are, for example; benzoyl peroxide, 2,5-dimethyl, 2,5-ditertiarybutylperoxyhexane, tertiary butylperbenzoate, bis(2,4-dichlorobenzoyl)peroxide, ditertiarybutyl peroxide, dicumyl peroxide, tertiarybutylperoxyisopropyl carbonate, etc. These curing agents, or vulcanization accelerators as they are often designated, can be present in the organopolysiloxane compositions in amounts ranging from about 0.1 to as high as 4 to 8 parts or more based on 100 parts of organopolysiloxane blend. Curing techniques using addition cure, condensation cure or platinum type catalysts are also known in the art.

In addition to the above-described ingredients, the silicone rubber compositions of the invention can contain heat stability additives, compression set additives, additives to improve handling properties, dyes or coloring additives, additives to prevent crepe aging and other additives conventionally used in heat cured silicone elastomers and also room temperature cure elastomers.

In the preferred method of forming a handgrip of the invention, the silicone rubber composition is made by blending or milling together the various constituents. The order of adding the elastomer, filler, processing aid and additional processing additives is not critical. Preferably the organopolysiloxane elastomer, filler material, organosilicone processing aid, texturizing material and ceramic spheres are mixed together to form the uncured rubber composiiton. The rubber composition is heated during the blending operation and the texturizing material is evenly dispersed within the elastomer without reacting with the elastomer. Although the preferred method of blending is to hot mix the rubber composition, it will be understood that the composition could also be cold mixed, depending, for instance, upon the texturizing material utilized; that is, texturizing materials which are liquids at room temperatures could be utilized. The preferred rubber composition is then cooled, placed in a suitable mold, and cured using a conventional curing agent to form the handgrip. The temperatures at which the rubber compositions are cured to the solid elastomeric state depend upon the particular curing catalyst chosen, duration of cure, amount and type of filler, etc. The cured handgrip is then lightly buffed with sandpaper to give a rougher texture to the finished product.

In order that those skilled in the art will be better able to practice the invention, the following examples are given by way of illustration and not by way of limitation. All parts are parts by weight.

EXAMPLE I

A silicone rubber composition was prepared by mixing 100 parts of methylpolysiloxane gum with a small amount of methylvinyl units, 32 parts fumed silica filler, 10 parts ceramic spheres, 4.4 parts of a processing aid comprising an organosilicone fluid, 1.4 parts conventional structure control and aging additives, and 28.8 parts ZONAREZ B-115 polyterpene resin. The mixture was blended in a doughmixer and heated to 320° F. for two hours in order to achieve an even dispersion of the resin and spheres within the gum. The composition was then allowed to cool to room temperature, then mixed with an organoperoxide catalyst and then placed in a suitable mold and cured in the shape of a handgrip. The exterior surface of the cured product was lightly sanded.

EXAMPLE II

The process of Example I was repeated except that NEVTAC-100 polyterpene resin was substituted as the texturizing material.

The rubber compositions of Examples I and II, when cured to form slip-over golf club grips, possessed the usual durability and weatherability characteristic of silicone rubbers but also possessed a tacky, non-slip feel which afforded improved gripping characteristics even when wet.

An invention has been provided with significant advantages. The handgrips of the invention have the desirable weathering and aging characteristics of cured silicone rubbers but with improved non-slip features.

While the invention has been shown in only two of its forms, it is not thus limited but is susceptible to various changes and modifications without departing from the spirit thereof.

I claim:

1. A method of forming a handgrip having improved non-slip features, comprising:

blending a silicone rubber composition from an organopolysiloxane elastomer, a filler material, an organosilicon processing aid, a texturizing material, and a quantity of hollow spheres, the hollow spheres having a density in the range from 0.5 to 0.9 grams/cc;

heating said rubber composition during the blending step to evenly disperse said texturizing material and said hollow spheres within said rubber composition without reacting said texturizing material with said organopolysiloxane elastomer;

cooling and curing said composition to form a handgrip the exterior surface of said handgrip being formed to contain exposed portions of said hollow spheres which are blended throughout said silicone rubber composition;

buffing the exterior surface of said handgrip to fracture the exposed portions of said hollow spheres and thereby present a roughened exterior surface to said handgrip.

2. The method of forming a silicone rubber handgrip of claim 1, wherein said hollow spheres are silica alumina ceramic spheres having a density of about 0.7.

3. The method of forming a silicone rubber handgrip of claim 2, wherein said texturizing material which is blended into said silicone rubber composition is a synthetic polyterpene resin.

* * * * *